(12) United States Patent
Anshita

(10) Patent No.: US 7,907,837 B2
(45) Date of Patent: Mar. 15, 2011

(54) IMAGE BLUR CORRECTION APPARATUS

(75) Inventor: Yohei Anshita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 12/403,735

(22) Filed: Mar. 13, 2009

(65) Prior Publication Data
US 2009/0232483 A1 Sep. 17, 2009

(30) Foreign Application Priority Data

Mar. 14, 2008 (JP) ................................. 2008-066211

(51) Int. Cl.
G03B 17/00 (2006.01)
H04N 5/228 (2006.01)
G02B 27/64 (2006.01)

(52) U.S. Cl. .................. 396/55; 348/208.7; 348/208.11; 359/557

(58) Field of Classification Search .................... 396/55; 348/208.99, 208.7, 208.11; 359/554, 557
See application file for complete search history.

(56) References Cited

U.S. PATENT DOCUMENTS
2005/0254806 A1* 11/2005 Noguchi ......................... 396/55

FOREIGN PATENT DOCUMENTS
JP 6-242485 9/1994
JP 3229899 9/2001

* cited by examiner

Primary Examiner — Rochelle-Ann J Blackman
(74) Attorney, Agent, or Firm — Canon USA Inc IP Div

(57) ABSTRACT

In an image blur correction apparatus, rotation of a correction lens about an optical axis is regulated without special mechanism or drive unit. When displacing a third lens unit in a pitch and yaw directions, forces Bp, By driving a shift base are generated in the respective directions by Lorentz force, to generate forces Cp, Cy, Dp, Dy returning a magnet to an original position by attraction force. By, Cy and Bp, Dp, respectively, are exerted on the same axes, whereas Cp, Dy are not in the same axes as those of Bp, By, respectively, so that a rotational moment for the shift base is generated and the shift base is stabilized at a first angle. Since the first angle is smaller than a second angle regulated by a restriction portion for a shift movement frame, the shift base does not abut the shift movement frame to deteriorate image stabilization.

3 Claims, 11 Drawing Sheets

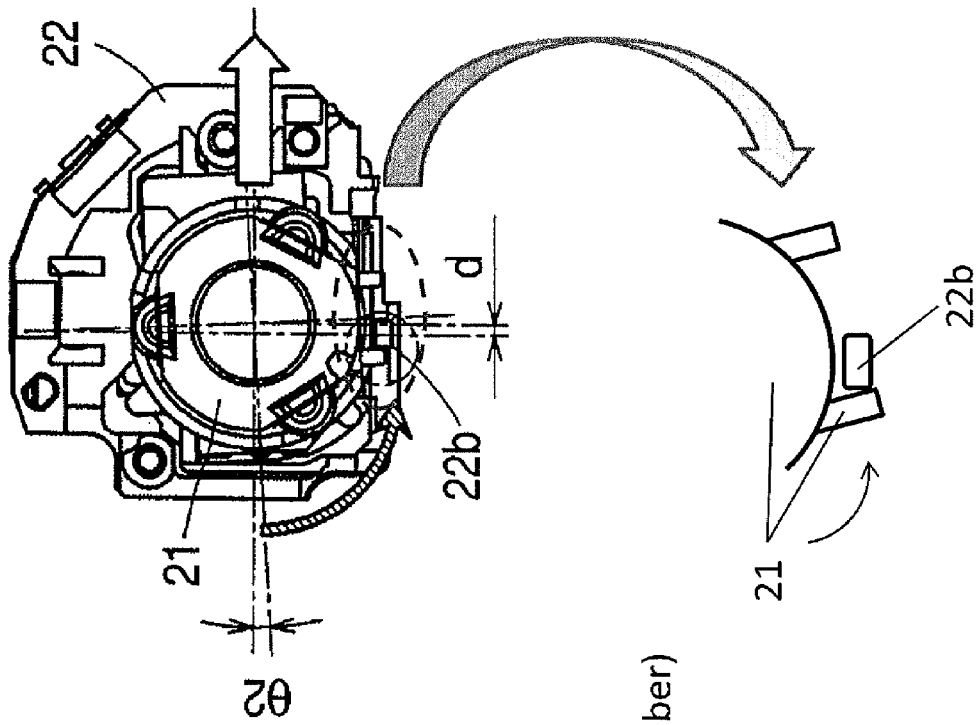
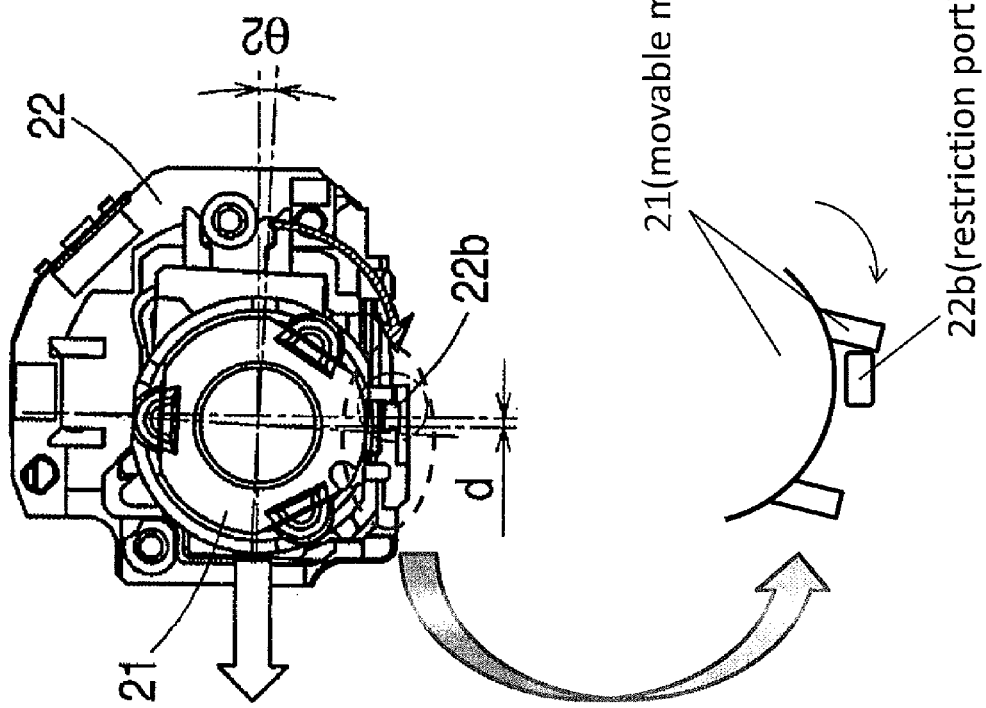

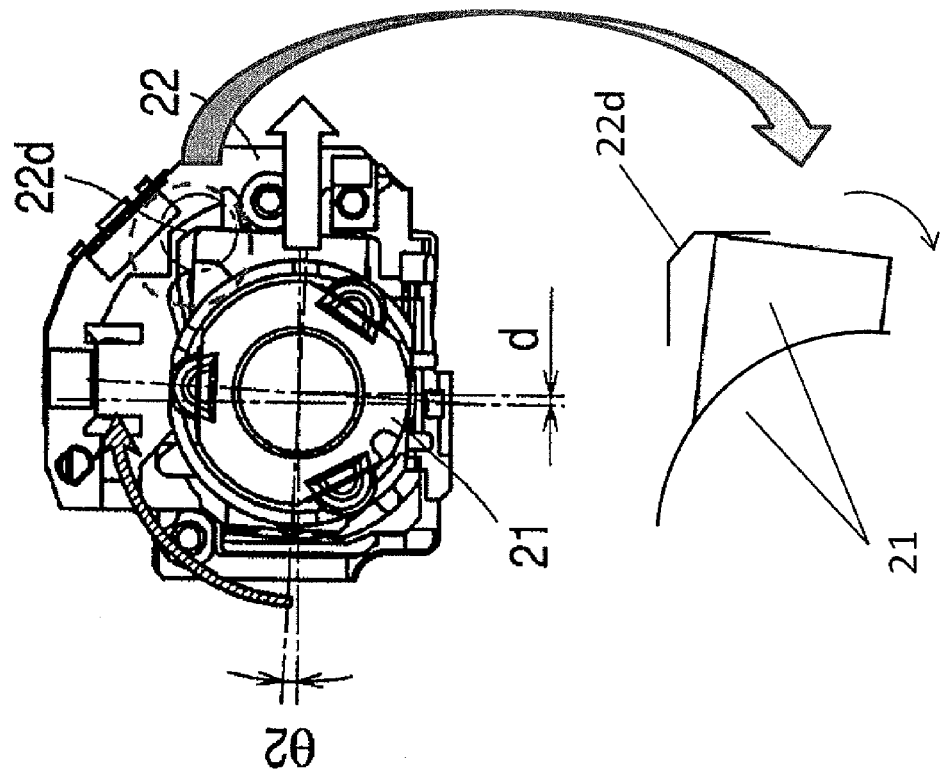
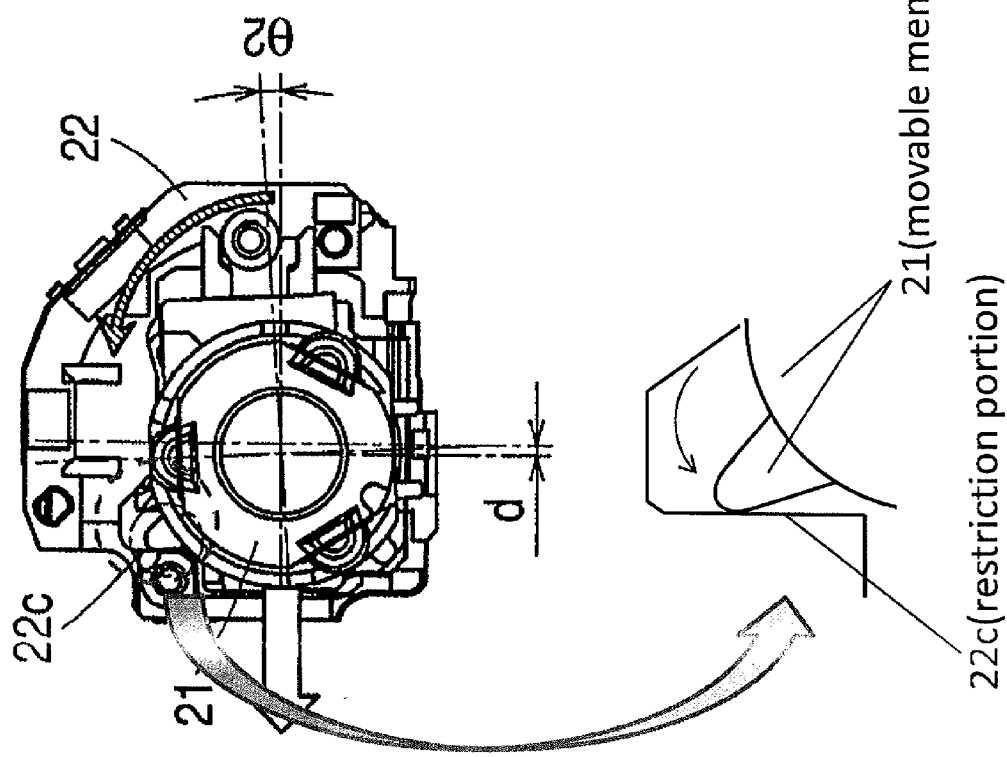

IMAGE BLUR CORRECTION APPARATUS

BACKGROUND OF THE INVENTION

1. Field of the Invention

The present invention relates to an image blur correction apparatus for effecting image blur correction in a lens barrel or the like.

2. Description of the Related Art

Conventionally, as an apparatus for preventing image blur due to hand-shake or the like, which is likely to occur in hand-held photography or the like, there has been known an image blur correction apparatus which detects the shake condition of a camera by a shake detector and which shifts a correction lens in a direction orthogonal to an optical axis in accordance with the detection.

In a camera provided with an image blur correction apparatus, a correction lens constituting at least a part of a photography lens system is movably supported.

By moving this correction lens in a plane orthogonal to the optical axis of the principal optical system so as to compensate shaking, deviation of the imaging position due to shaking is corrected, thereby eliminating image blur.

A problem with this image blur correction apparatus is the adverse influence due to rotation of a movable member, which movably supports the correction lens for image blur prevention, in a plane orthogonal to the optical axis of the movable member.

Generally speaking, a center of gravity of the movable member is at a position deviated from the axis of a direction of a driving force generated by a drive unit for moving the movable member. Therefore, at the time of image blur correction, a rotational moment which causes the movable member to rotate in a plane orthogonal to the optical axis is generated by the driving force.

Further, a force causing the movable member to rotate is also generated by phenomena other than the driving force such as vibration and friction.

Thus, without a unit for suppressing rotation of the movable member within a plane orthogonal to the optical axis, the movable member would be allowed to freely rotate during the image blur correction operation, to thereby come into contact with a fixed member. Thus, there is a danger of the driving characteristics being changed or the image being disturbed.

A position detection sensor of the image blur correction apparatus is formed of a combination of a magnet and a magnetic sensor, a combination of a light emitter and a light receiving element, or the like.

In such a position detection sensor, it is assumed that the correction lens moves, in a plane perpendicular to the optical axis, in one direction: a yaw direction which is a horizontal direction in a plane perpendicular to the optical axis in a posture of camera or the like in use, or a pitch direction which is a vertical direction in a plane perpendicular to the optical axis in the posture of camera or the like in use.

Thus, when the correction lens rotates to a large degree, the output characteristics of the position detection sensor undergo a change to make it impossible to perform accurate position detection, generating so-called cross talk.

Further, when the position detection changes due to the rotation, there is also generated oscillation in feedback position control, which further leads to deterioration in the optical performance at the time of hand-shake correction.

As a measure for suppressing rotation of the movable member about the optical axis, there has been proposed an image blur correction apparatus in which a correction lens held by the movable member is displaced in the yaw direction or the pitch direction without being rotated about the optical axis.

For example, Japanese Patent No. 3229899 discloses an image blur correction apparatus provided with a guide shaft for regulating rotation, and Japanese Patent Application Laid-Open No. H06-242485 discloses an image blur correction apparatus in which there is further provided a drive unit for suppressing rotation for the purpose of regulating rotation.

In the configuration of Japanese Patent No. 3229899, in order to allow the correction lens to move in the yaw direction and the pitch direction, which are two axial directions orthogonal to each other within the same plane, there is adopted a gimbal structure in which the correction lens is guided and held by two guide shafts.

In order to correct image blur, a response to a frequency band of up to several tens Hz is necessary, and the positional accuracy must be controlled with high precision, and hence retention relatively free from friction and backlash is indispensable.

Thus, in the construction of Japanese Patent No. 3229899, double fitting is required for the two guide shafts to accurately displace the correction lens in the same plane.

It is rather difficult to maintain such double fitting with high precision without involving any backlash. In reality, adjustment, etc. are required, resulting in a rather high cost.

Further, in this construction, rotational moment causing the movable member to rotate is allowed to remain, and hence, when the movable member is displaced, a twisting force is generated between the guide shafts and a bearing provided in a movement frame, and a deterioration in minute amplitude characteristics occurs as a result of the influence of friction due to this twisting force.

In the construction of Japanese Patent Application Laid-Open No. H06-242485, there is provided a drive unit for suppressing rotation about the optical axis in addition to the drive unit for driving the correction lens in the yaw and pitch directions.

In this case, it is possible to achieve an improvement in terms of deterioration in minute amplitude characteristics due to friction in the mechanism as in the case of Japanese Patent No. 3229899. However, the provision of another drive unit leads to complicated control, and increases in power consumption, in the number of parts, in assembly man-hours, and in cost.

Due to the recent progress in the semiconductor fine processing technology, in an image pickup element such a CCD or CMOS, which converts an object image formed in a focal plane by a photography optical system into an electric signal, it has become possible to produce image pickup elements of smaller pixel pitch.

As a result, there have been generated the following two tendencies: a further downsizing of the optical system through preparation of as many pixels as in the prior art in a smaller area, and a further enhancement in the resolution of the optical system due to an increase in the number of pixels in the same area or through an increase in area.

In the former, the moving amount of a shift lens unit for the correction of hand-shake of the same amount is substantially proportional to the image pickup area, and hence a still finer movement is required, and a movement of still higher precision is required.

SUMMARY OF THE INVENTION

The present invention provides an image blur correction apparatus which solves the above-mentioned problems in the related art and is capable of regulating rotation of an image stabilization optical element or an image pickup element around the optical axis without newly providing a special mechanism or drive unit.

According to one aspect of the present invention, an image blur correction apparatus comprises:

a movable member retaining one of an image stabilization optical element movable in a direction orthogonal to an optical axis and an image pickup element movable in the direction orthogonal to the optical axis;

a ball effecting positioning on the movable member in an optical axis direction;

a fixed member effecting positioning on the ball in the optical axis direction; and a drive unit provided with a magnet for driving provided on one of the movable member and the fixed member, and with a coil and a magnetic member provided on another of the movable member and the fixed member, wherein the movable member is retained at a center by an attraction force of the magnet for driving, with the movable member regulating, at a time of its movement, rotation in a plane orthogonal to the optical axis by the attraction force of the magnet for driving to a magnitude equal to or smaller than a first rotation angle, wherein the rotation in the plane orthogonal to the optical axis is regulated to a magnitude smaller than a second rotation angle by a rotating direction restriction portion provided on the fixed member, and wherein the first rotation angle is smaller than the second rotation angle.

According to a further aspect of the present invention, in the image blur correction apparatus set out in the foregoing, the rotating direction restriction portion is configured to have a leeway amount with respect to the movable member in a first direction of the first rotation angle due to the attraction force of the magnet for driving and a leeway amount with respect to the movable member in a second direction opposite to the first direction which is smaller than the leeway amount in the first direction.

According to one aspect of the present invention, a lens barrel comprises the image blur correction apparatus set out in the foregoing.

In the image blur correction apparatus according to the present invention, it is possible to suppress rotation of the movable member around the optical axis by a return force due to the attraction force generated from the magnet for driving without newly providing a special mechanism or drive unit.

BRIEF DESCRIPTION OF THE DRAWINGS

FIGS. 9A, 9B, 9C and 9D are explanatory view illustrating a rotating direction restriction portion provided in the shift movement frame and a shift base.

DESCRIPTION OF THE EMBODIMENTS

Embodiments of the present invention are described in detail with reference to the drawings.

First Embodiment

Figure 1:
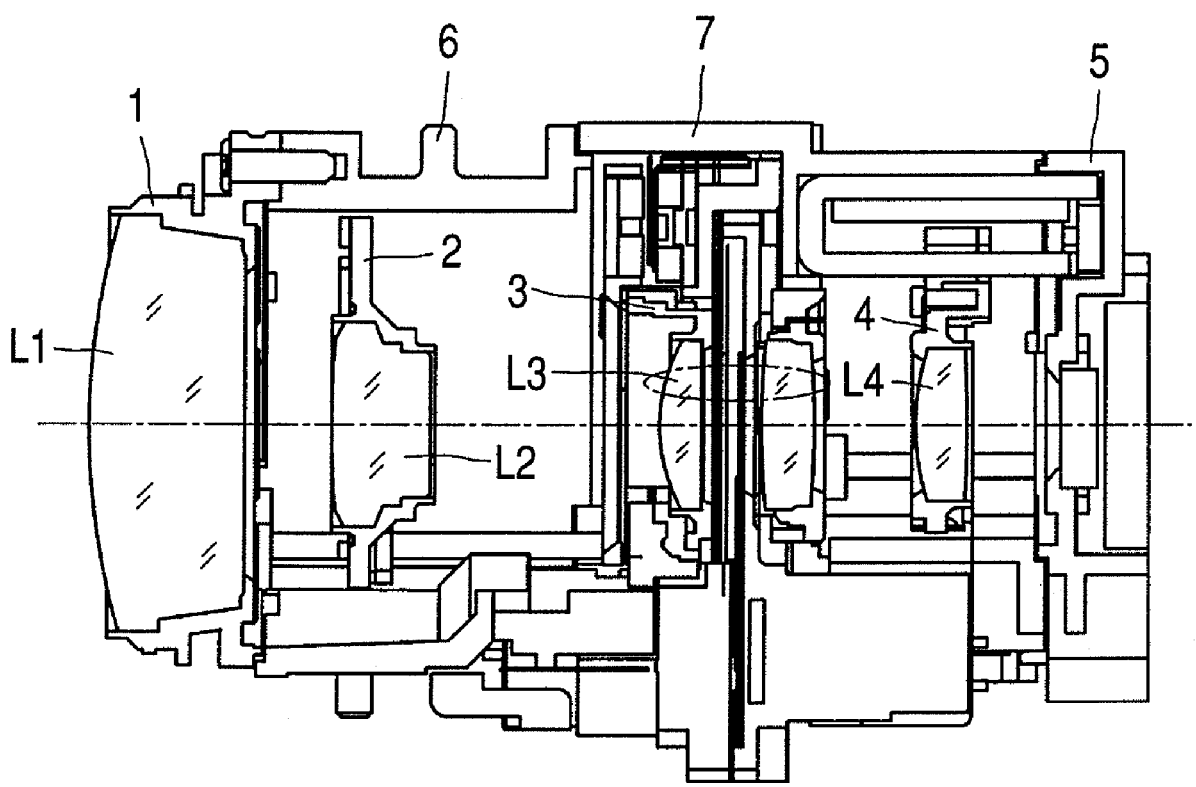
FIG. 1 is a sectional view of a lens barrel according to a first embodiment.
Figure 2:
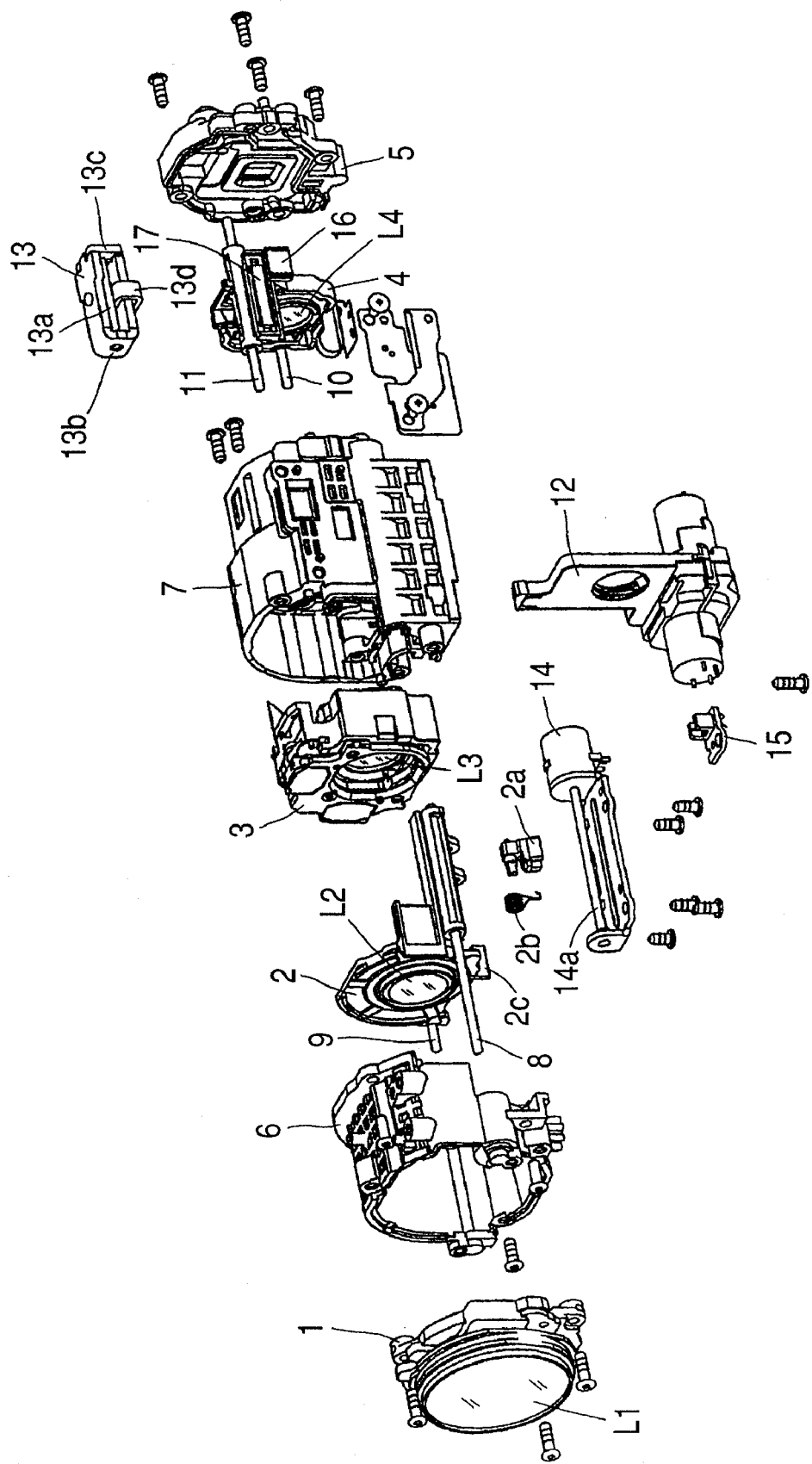
FIG. 2 is an exploded perspective view of the lens barrel.

FIG. 1 is a sectional view of a lens barrel provided with an image blur correction apparatus according to a first embodiment of the present invention, and FIG. 2 is an exploded perspective view thereof.

This lens barrel is mounted to a photographic apparatus such as a video camera or a digital still camera or integrally fixed thereto to be used.

This lens barrel has a zooming optical system including lens units constituted by four convex/concave/convex/convex lens units.

That is, there are arranged, in the optical axis direction, a fixed first lens unit L1, a second lens unit L2 for magnification, a third lens unit L3 for preventing image blur, and a fourth lens unit L4 for focusing.

The second lens unit L2 moves in the optical axis direction to perform magnification operation, the third lens unit L3 moves in a direction orthogonal to the optical axis, that is, in the longitudinal direction and the lateral direction described below, to function as a movable image stabilization optical element that effects blur correction, and the fourth lens unit L4 moves in the optical axis direction to perform focusing operation.

The first lens unit L1 is retained by a stationary lens barrel 1, the second lens unit L2 is retained by a second unit moving frame 2, the third lens unit L3 is retained by a shift unit 3, and the fourth lens unit L4 is retained by a fourth unit moving frame 4.

At the rear of the fourth unit moving frame 4, there is provided a CCD holder 5, to which an image pickup element constituted by a CCD or the like is fixed.

The stationary lens barrel 1 fastened to a front fixed cylinder 6 by a screw, and the CCD holder 5 and the front fixed cylinder 6 are fixed to a rear fixed cylinder 7 by a screw.

The second unit moving frame 2, which is fixed in position by the front fixed cylinder 6 and the rear fixed cylinder 7, is supported by guide bars 8 and 9 so as to be movable in the optical axis direction. Further, the fourth unit moving frame 4 is supported by guide bars 10 and 11 so as to be movable in the optical axis direction.

The shift unit 3 is fixed in position with respect to the rear fixed cylinder 7, and is fixed by two screws.

A stop apparatus 12 arranged within the third lens unit L3 is of a so-called guillotine type which varies the aperture diameter of the optical system through movement in opposite directions of two stop diaphragms.

The fourth lens unit L4 is driven in the direction of the optical axis by a voice coil motor 13, which includes a magnet 13a, yokes 13b and 13c, and a coil 13d.

In the voice coil motor 13, the yoke 13b is forced into the rear fixed cylinder 7 and fixed thereto, and the magnet 13a and the yoke 13c are fixed to the yoke 13b by magnetic force.

By passing an electric current through the coil 13d, a Lorentz force is generated in the coil 13d, making it possible for the coil 13d to be driven in the optical axis direction.

The coil 13d is fixed to the fourth unit moving frame 4, by driving the coil 13c, the fourth unit moving frame 4 is driven in the optical axis direction.

A zoom motor 14 is fixed to the rear fixed cylinder 7 by two screws, and the second lens unit L2 is driven in the optical axis direction by the zoom motor 14 to perform magnification operation.

The zoom motor 14 has a rotatable rotor and a lead screw 14a coaxial thereto, the lead screw 14a is in mesh with a rack 2a provided on the second movement frame 2, and the second lens unit L2 is driven in the optical axis direction through rotation of the rotor.

In each of the second unit moving frame 2, the guide bars 8 and 9, the rack 2a, and the lead screw 14a, backlash is offset by a torsion coil spring 2b, preventing backlash in fit-engagement or meshing.

A photo interrupter 15 optically detects movement in the optical direction of a light-blocking portion 2c formed on the second unit moving frame 2, and is used as a zoom reset switch for detecting that the second lens unit L2 is situated at a reference position.

An optical sensor 16 fixed to the rear fixed cylinder 7 includes a light emitting portion and a light receiving portion. The optical sensor 16 irradiates scale 17 glued to the fourth group movement frame 4 with light emitted from the light emitting portion to read reflected light by the light receiving portion, thereby detecting the absolute position of the fourth lens unit L4.

Figure 3:
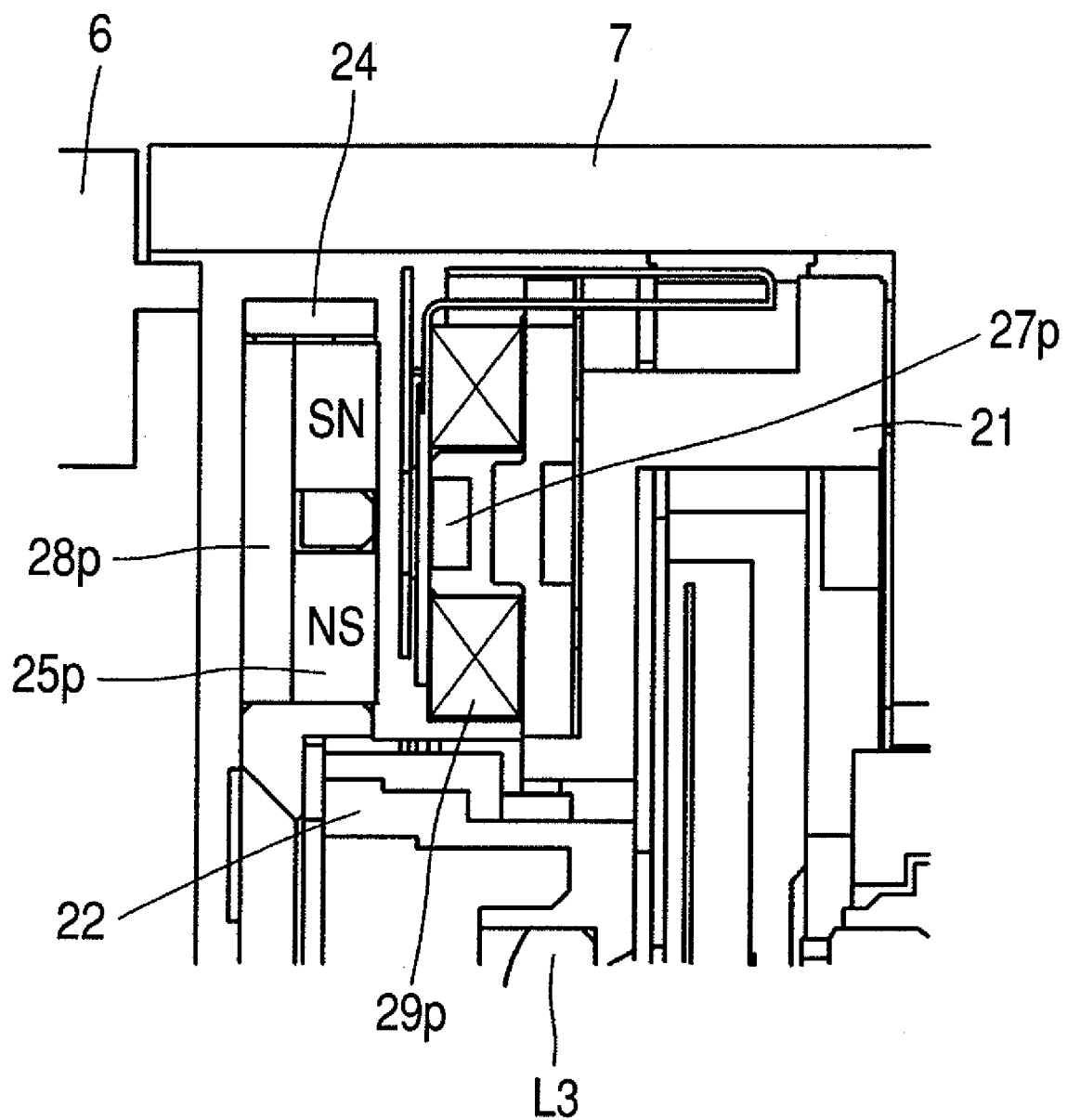
FIG. 3 is an enlarged sectional view of a drive unit of a shift unit.
Figure 4:
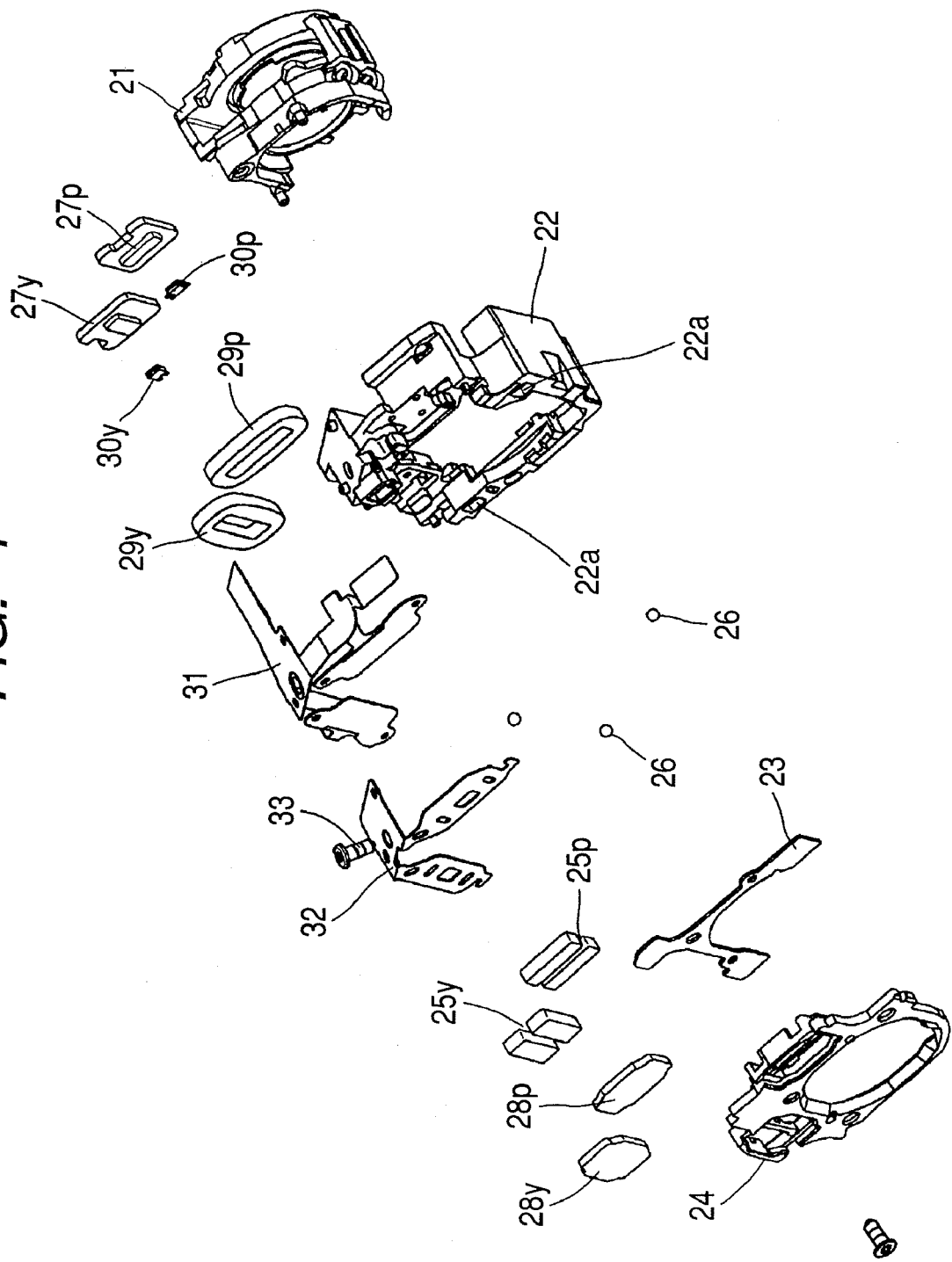
FIG. 4 is an exploded perspective view of the drive unit of the shift unit.

FIG. 3 is an enlarged sectional view of a pitch-direction drive unit of the shift unit 3, and FIG. 4 is an exploded perspective view thereof.

A pitch-direction actuator and a position sensor are arranged so as to be at 90 degrees with respect to each other, and further, a yaw-direction actuator and a position sensor are arranged so as to be at 90 degrees with respect to each other. They are of the same construction, and hence the following description centers on the pitch direction actuator and a position sensor. The subscripts p and y added to the reference numerals of the members represent the pitch direction and the yaw direction, respectively.

In the shift unit 3, there are arranged a shift movement frame 21 that is a movable member, a shift base 22 that is a stationary member, a metal plate 23, and a magnet base 24.

The shift movement frame 21 retains the third lens unit L3, and further, is displaced in a direction orthogonal to the optical axis in order to correct image blur.

The magnet base 24 is integrally fixed to the shift movement frame 21 by a screw, with the metal plate 23 being held therebetween.

Stainless steel, for example, is suitable as the material of the metal plate 23.

A magnet 25p is forced into the magnet base 24 and retained therein for both driving and position detection.

Due to the incorporation of the magnet 25p into the magnet base 24 through forcing-in, the positional relationship between the magnet base 24 and the magnet 25p is not deviated after the incorporation. Thus, the position of the magnet 25p, which also has a position detecting function, is fixed in position with respect to the shift movement frame 21, and it is possible to accurately detect the position of the third lens unit L3 by the magnet 25p.

Between the shift base 22 and the magnet base 24, three balls 26 are arranged around the optical axis and in a plane perpendicular to the optical axis.

The balls 26 are rotatably retained at a ball holder portion 22a formed in the shift base 22.

As the material of the balls 26, stainless steel or the like can be suitably employed so that the balls 26 may not be attracted by the magnet 25 arranged in the vicinity thereof.

Due to the presence of the metal plate 23 between the balls 26 and the magnet base 24, it is possible, when the lens barrel receives impact, to prevent the magnet base 24, which is a molding, from being dented by the balls 26 to cause deterioration in the drive characteristics of the shift movement frame 21.

The force which reliably holds the balls 26 in contact with the shift base 22 and the metal plate 23 is an attraction force exerted between the magnet 25p and a yoke 27p, which is formed of a magnetic member.

Due to this attraction force, the magnet base 24 is urged toward the shift base 22, whereby the three balls 26 are held in press contact with three portions of the end surfaces in the optical axis direction of the three ball holder portions 22a and the metal plate 23.

The surfaces held in contact with the three balls 26 expand in a direction orthogonal to the optical axis of the photography optical system.

The three balls 26 have the same nominal diameter, and hence the differences in position in the optical axis direction among the end surfaces in the optical axis direction of the three ball holder portions 22a are maintained at low level.

As a result, the third lens unit L3 retained by the shift base 22 does not tilt with respect to the optical axis, and can be moved within a plane orthogonal to the optical axis.

Figure 5:
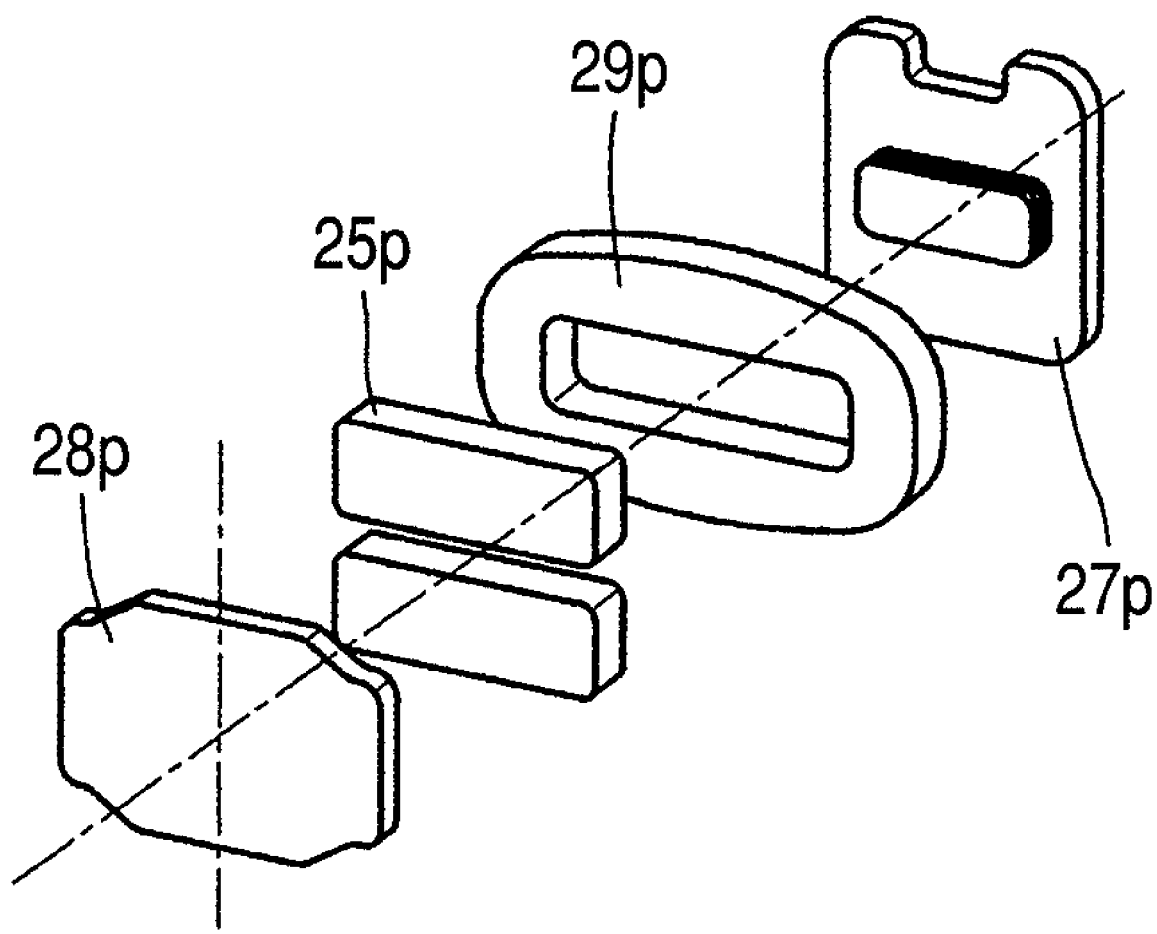
FIG. 5 is a structural diagram of the drive unit.

FIG. 5 is a schematic view of the drive unit of this embodiment. In the drive unit, the magnet 25p, a front yoke 28p, a coil 29p, and a rear yoke 27p are arranged symmetrically with respect to the center of the drive unit so that the direction of the driving force of the drive unit may be one of the pitch directions and the yaw directions.

As described above, the magnet 25p, fixed to the magnet base 24, is bipolarized radially from the optical axis as illustrated in FIG. 5, and the front yoke 28p is attracted and fixed to the magnet 25p, and the front yoke 28p converges the magnetic flux on the front side in the optical axis direction of the magnet 25p.

The coil 29p is glued and fixed to the other shift movement frame 21, and the rear yoke 27p converges the magnetic flux on the rear side in the optical direction of the magnet 25p.

The rear yoke 27p is arranged on the opposite side of the magnet 25p with the coil 29p being held therebetween, and is retained by the shift base 22, and a magnetic circuit is formed by the magnet 25p, the yokes 28p and 27p, and the coil 29p.

When an electric current is passed through the coil 29p, there is generated, in a direction substantially orthogonal to the magnetization boundary of the magnet 25p, a Lorentz force due to repulsion between the magnetic lines of force generated in the magnet 25p and the coil 29p.

As a result, the magnet base 24 is moved in a direction orthogonal to the optical axis, forming a so-called moving magnet type actuator.

An actuator of this construction is arranged in each of the longitudinal direction and the lateral direction, and hence it is possible to drive the magnet base 24 and the shift movement frame 21 in two directions orthogonal to the optical axis direction which are substantially orthogonal to each other.

Through combination of these driving forces in the longitudinal direction and the lateral direction, it is possible to freely move the magnet base 24 and the shift movement frame 21 within a predetermined range of a plane orthogonal to the optical axis.

As long as the balls 26 do not come into contact with a wall of the ball holder portions 22a, the friction when the magnet base 24 acts in a direction orthogonal to the optical axis is solely the rolling frictions between the balls 26 and the metal plate 23 and between the balls 26 and the ball holder portions 22a.

Thus, in spite of the attraction force exerted, the magnet base 24, i.e., the shift movement frame 21 retaining the third lens unit L3, can be moved very smoothly within a plane orthogonal to the optical axis, and also allows fine movement amount control.

By applying lubricant to the balls 26, it is possible to further reduce the frictional force.

A Hall effect element 30p coverts the magnetic flux density into an electric signal, and is soldered to an FPC (flexible printed cable) 31, with the FPC 31 being fixed in position with respect to the shift movement frame 21.

Further, an FPC holding member 32 is fixed to the shift movement frame 21 by a screw 33, whereby the FPC 31 is prevented from rising, and positional deviation of the Hall effect element 30p is prevented.

Due to this construction, there is formed a position sensor for detecting the positions of the magnet base 24 and the third lens unit L3.

When the third lens unit L3 is driven longitudinally or laterally by the magnet base 24 and the shift movement frame 21, a change in the magnetic flux density of the magnet 25p is detected by the Hall effect element 30p, and an electric signal indicating this change in magnetic flux density is output.

Based on the output of the Hall effect element 30p, it is possible to detect the positions of the magnet base 24 and the third lens unit L3.

The magnet 25p serves not only as a driving magnet but also as a position detecting magnet.

In this embodiment, assuming a reference be a condition where the centers of the magnet and the coil coincide with each other in each of the two drive units, any rotational movement of the third lens unit L3 with respect to the reference within a plane orthogonal to the optical axis of the third lens unit L3 is suppressed to a level not more than a first rotation angle by a return force due to the attraction force.

The first rotation angle is smaller than a second rotation angle, which is regulated by a restriction portion in the rotating direction provided on the shift base 22.

Figure 6A:
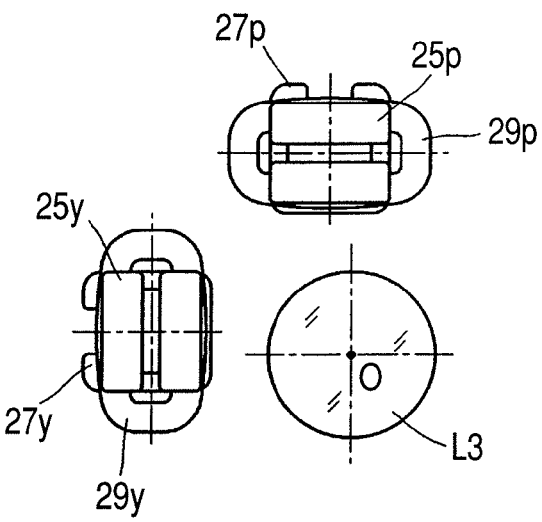
FIGS. 6A, 6B and 6C are explanatory views illustrating a relationship between an image blur correction lens and the drive unit.
Figure 6B:
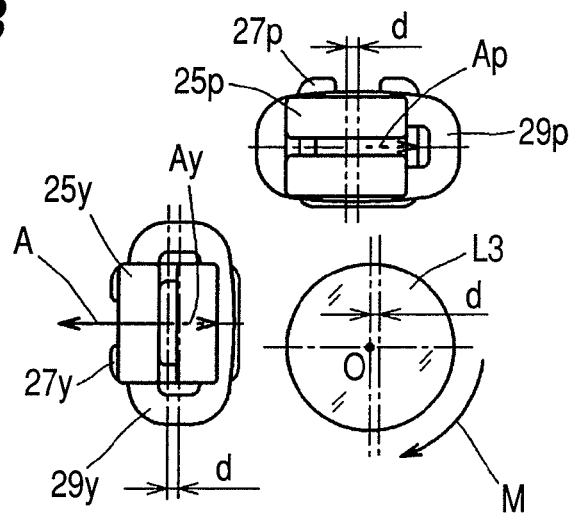
Figure 6C:
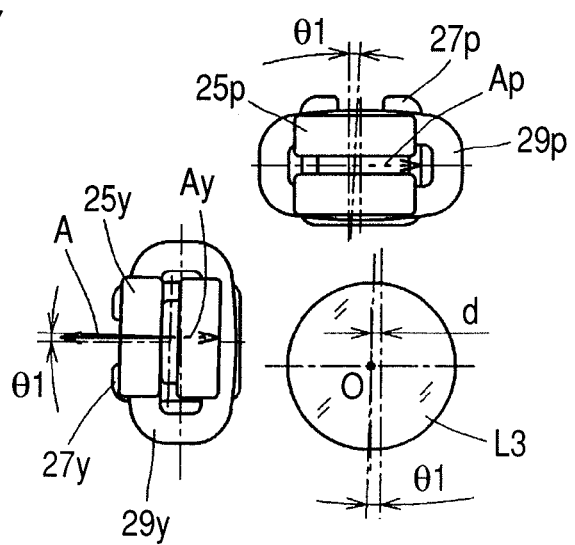

FIGS. 6A through 6C are explanatory views illustrating the relationship between the third lens unit L3 and the drive unit. FIG. 6A illustrates the arrangement of the stationary side coil 29 and the rear yoke 27 in the state in which the third lens unit L3 supported by the shift base 22 and the magnet 25 are at the central positions, with the center O of the third lens unit L3 being on the optical axis.

As taught by Coulomb's law, the attraction force exerted between the magnet 25 and the rear yoke 27 is proportional to the strength of the magnetic load of two objects and the reciprocal of the square of the distance between the two objects.

Thus, if the magnet 25 and the rear yoke 27 are of a symmetrical configuration with respect to the center of the drive unit, when the magnet 25 is at the central position of the drive unit, the attraction forces in the pitch direction and the yaw direction are in a balanced state in their respective directions.

When the magnet 25 moves from the center of the drive unit, the magnetic force on the side opposite to the moving direction increases, and hence there is generated an attraction force to bring the magnet 25 back to the center of the drive unit.

FIG. 6B illustrates the relationship between the driving force and the attraction force when the shift movement frame 21 is displaced in the yaw direction y from the position as illustrated in FIG. 6A.

If, when displacing the shift movement frame 21 in the yaw direction, an electric current is passed through the coil 29y, there is generated a driving force A driving the shift movement frame 21 in the yaw direction y by the Lorentz force generated from the coil 29y.

When the shift movement frame 21 is moved by a distance d by the driving force A, the magnet 25 arranged in the shift movement frame 21 is also moved by the distance d from the central position of the drive unit, and there is generated a return force Ap, Ay returning the magnet 25 to the former position by the attraction force.

At this time, the driving force A and the return force Ay are exerted in the same axis as the axis in the driving force direction. However, the return force Ap acting on the drive unit in the pitch direction p is not in the same axis as the driving force A, and hence there is generated a rotation moment M causing the shift movement frame 21 to rotate by the driving force A and the return force Ap.

FIG. 6C illustrates a state in which the rotational moment due to the driving force A and the return force Ap of FIG. 6B are balanced.

The center point O of the third lens unit L3 moves by the distance d in the yaw direction y from the optical axis, and a state is attained in which the shift movement frame 21 is rotated by a first rotation angle θ1 within a plane orthogonal to the optical axis.

At this time, the rotating direction in the plane orthogonal to the optical axis is in a stable state in which the driving force A and the return force Ap balance, and hence if further force is exerted in the rotating direction, there is generated a force to effect returning to the position of the first rotation angle θ1.

In this way, in this embodiment, due to the attraction force acting on the magnet 25 and the rear yoke 27 at the time of movement of the shift movement frame 21, there is generated a return force toward the center of the drive unit, and hence it is possible to suppress the movement in the rotating direction to a level not more than the first rotation angle θ1.

It is desirable for the first rotation angle θ to be 3 degrees or less.

Here, in order to move the third lens unit L3 to an arbitrary position despite the rotation of the shift movement frame 21 as illustrated in FIGS. 6A through 6C, it is necessary for the position of the third lens unit L3 to be accurately detected even if the shift movement frame 21 rotates.

Figure 7:
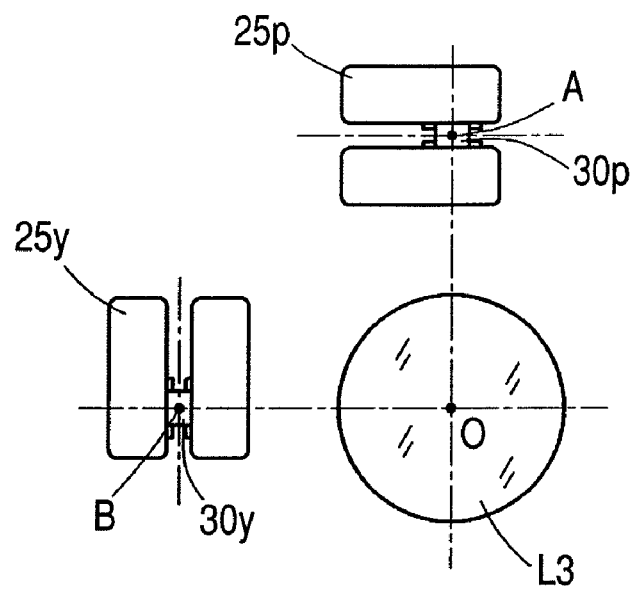
FIG. 7 is a diagram illustrating a layout of a Hall effect element, a magnet, and the image blur correction lens.

FIG. 7 illustrates the arrangement of the third lens unit L3, the magnet 25, and the Hall effect elements 30 serving as a position detecting device when the drive unit is at the central position.

The Hall effect elements 30p and 30y in the pitch direction and the yaw direction are arranged such that the intersection of the detecting direction axes thereof coincide with the optical axis.

The Hall effect elements 30p and 30y detect the magnetic flux density component of the magnets 25p and 25y in the optical axis direction, making it possible to find the position of the magnet 25 from the change in magnetic flux density at the time of displacement in the driving direction.

Figure 8:
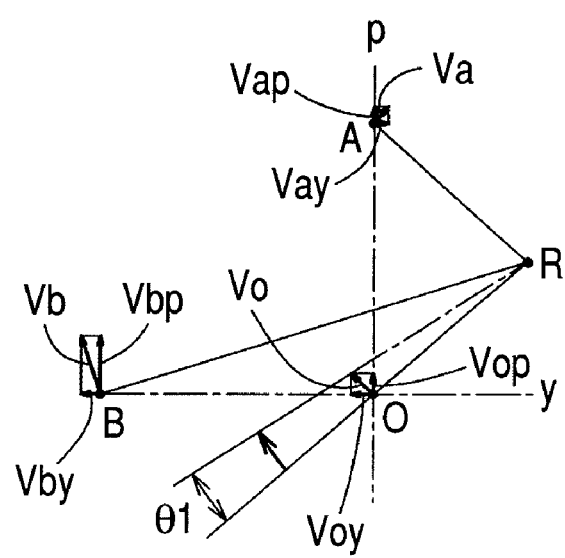
FIG. 8 is an explanatory view illustrating position detection when a shift movement frame rotates.

FIG. 8 is an explanatory view illustrating a change in the output values of the Hall effect elements 30p and 30y when the shift movement frame 21 rotates by the first rotation angle θ1 about an arbitrary point within a plane orthogonal to the optical axis.

Assuming that the position detection points in the pitch direction and the yaw direction are A and B, respectively, and that the central point of the third lens unit L3 is O, when the shift movement frame 21 is rotated about a point R, the points A, B, and O move in a direction perpendicular to straight lines connecting them to the point R if the first rotation angle θ1 is not so large.

Suppose that reference symbols Va, Vb, and Vo indicate the movements of the points A, B, and O, and that reference symbols Vap, Vay, Vbp, Vby, Vop, and Voy indicate the components of the movements in the directions of the detecting direction axis y in the yaw direction and the detecting direction axis p in the pitch direction.

The Hall effect elements 30p and 30y exhibit scarcely any sensitivity with respect to the magnetic flux perpendicular to the detecting direction, and hence the components Vap and Vby are not detected by the Hall effect elements 30p and 30y, respectively.

Further, the intersection of the two detecting direction axes p and y coincides with the optical axis O, and hence the following relationships hold true with respect to the pitch direction component and the yaw direction component of the movement of the optical axis O:

Vop=Vap

Voy=Vby

This indicates that it is possible to detect the movement amount of the center of the third lens unit L3 without being affected by the rotation. Through positioning control, it is possible to move the third lens unit L3 to the correct position.

As described above, it can be seen that, if the rotation angle is not excessively large, it is possible to accurately detect the position of the third lens unit L3 even if the shift movement frame 21 rotates.

Normally, the shift movement frame 21 has two drive units for generating driving forces in two independent directions in a plane orthogonal to the optical axis so as to move the third lens unit L3 within the plane.

The drive units are only large enough to effect image blur correction, and hence, when the shift movement frame 21 rotates greatly, the magnets 25 of the drive units are displaced away from the coils 29, with the result that the driving forces are very small or cannot be generated.

Further, around the shift movement frame 21, there are arranged the movement frame and a bar of another unit, a stop apparatus, and a fixed cylinder, and hence, if there is a rotational movement in a direction different from the direction of the driving force of the drive unit, surplus peripheral space is necessary in order to avoid contact.

Thus, the shift movement frame 21 cannot rotate by 360 degrees with respect to the shift base 22, and it is necessary to regulate the rotation angle by the shift base 22.

FIGS. 9A through 9D are explanatory views of a rotating direction restriction portion of this embodiment provided on the shift base 22 of the shift movement frame 21 as seen from the image pickup element side.

FIGS. 9A and 9B illustrate a state in which, when the shift base 22 including the shift movement frame 21 is moved in the yaw direction by a distance d, the shift movement frame 21 rotates clockwise and counterclockwise by a second rotation angle θ2, with the shift movement frame 21 and the shift base 22 being in contact with each other.

FIGS. 9C and 9D illustrate a state of the shift movement frame 21 and the shift base 22 when their movement is effected by the distance d in a direction opposite to that in FIGS. 9A and 9B.

At each position, the rotation angle of the shift movement frame 21 is constantly regulated in the range of not more than the second rotation angle θ2 by the rotating direction restriction portions 22b, 22c, and 22d of the shift base 22 and a restriction portion (not shown).

It is desirable for the second rotation angle θ2 to be, for example, approximately 5 degrees, which gives some leeway to the first rotation angle θ1.

Figure 10:
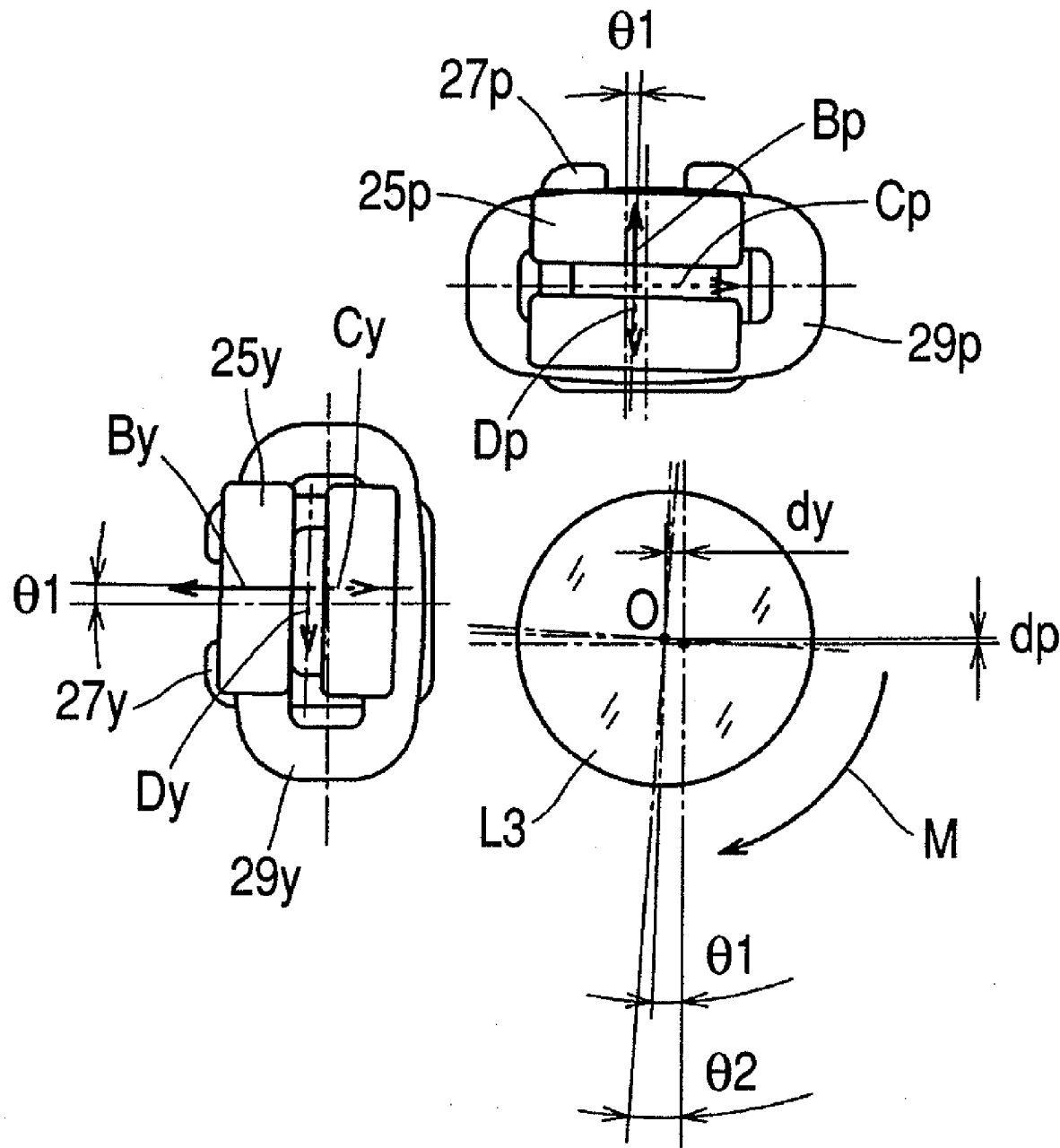
FIG. 10 is an explanatory view illustrating a force relationship in the shift movement frame at the time of general image blur correction.

FIG. 10 is an explanatory view illustrating the relationship in this embodiment between the first rotation angle θ1 due to the attraction force of the magnet 25, the second rotation angle θ2 regulated by the rotating direction restriction portions of the shift base 22, and the third lens unit L3.

When the third lens unit L3 is displaced by dp and dy in the pitch direction and the yaw direction, respectively, there are generated, due to a Lorentz force generated from the coil 29, driving forces Bp and By driving the shift movement frame 21 in the pitch direction and the yaw direction.

Due to the driving forces Bp and By, there are generated return forces Cp, Cy, Dp, and Dy returning the magnet 25 to the former position due to the attraction force.

At this time, the driving force By and the return force Cy are exerted on the same driving force direction axis, and the driving force Bp and the return force Dp are exerted on the same driving force direction axis, whereas the return force Cp exerted on the drive unit in the pitch direction and the return force Dy exerted in the yaw direction are not on the same axes as the drive unit driving forces Bp and By, respectively.

As a result, there is generated a rotational moment M rotating the shift movement frame 21 by the driving forces Bp and By and the return forces Cp and Dy, and the shift movement frame 21 is stabilized at the position of the first rotation angle θ1.

Here, the first rotation angle θ1 is smaller than the second rotation angle θ2 regulated by the rotating direction restriction portions 22b through 22d of the shift base 22, etc., and hence there is no risk of the shift movement frame 21 abutting the shift base 22 to adversely affect the image stabilization.

As a result, in this embodiment, it is possible to suppress the rotation of the shift movement frame 21 within the first rotation angle θ1 without having to newly provide a special mechanism or a drive unit for suppressing rotation.

Note that the first rotation angle θ1 is smaller than the second rotation angle θ2 regulated by the rotating direction restriction portions 22b through 22d provided on the shift base 22, etc., and hence there is no risk of the shift moving frame 21 coming into contact with the shift base 22 to adversely affect the image stabilization.

In this embodiment, the restriction portions, which are provided on the shift base 22, for restricting the rotational movement in a plane perpendicular to the optical axis of the shift movement frame 21 respectively have the leeway amount of the second rotation angle θ2 with respect to the shift movement frame 21 without depending on the rotating direction.

In reality, however, owing to the first rotation angle θ1 due to the return force attributable to the attraction force, the leeway amount can be small on the side opposite to the direction of rotation by the first rotation angle θ1.

In the embodiment described above, the shift movement frame 21 is driven by using a moving magnet type actuator.

However, this embodiment is also applicable to a case in which a moving coil type actuator is used, in which the coil is provided on the magnet base 24 side, with the magnet 25 being provided on the other shift base 22 side.

Further, while in the above-mentioned embodiment the third lens unit L3 is an image stabilization optical element, it is also possible to similarly move the image pickup element without involving any lens movement.

Second Embodiment

Figure 11:
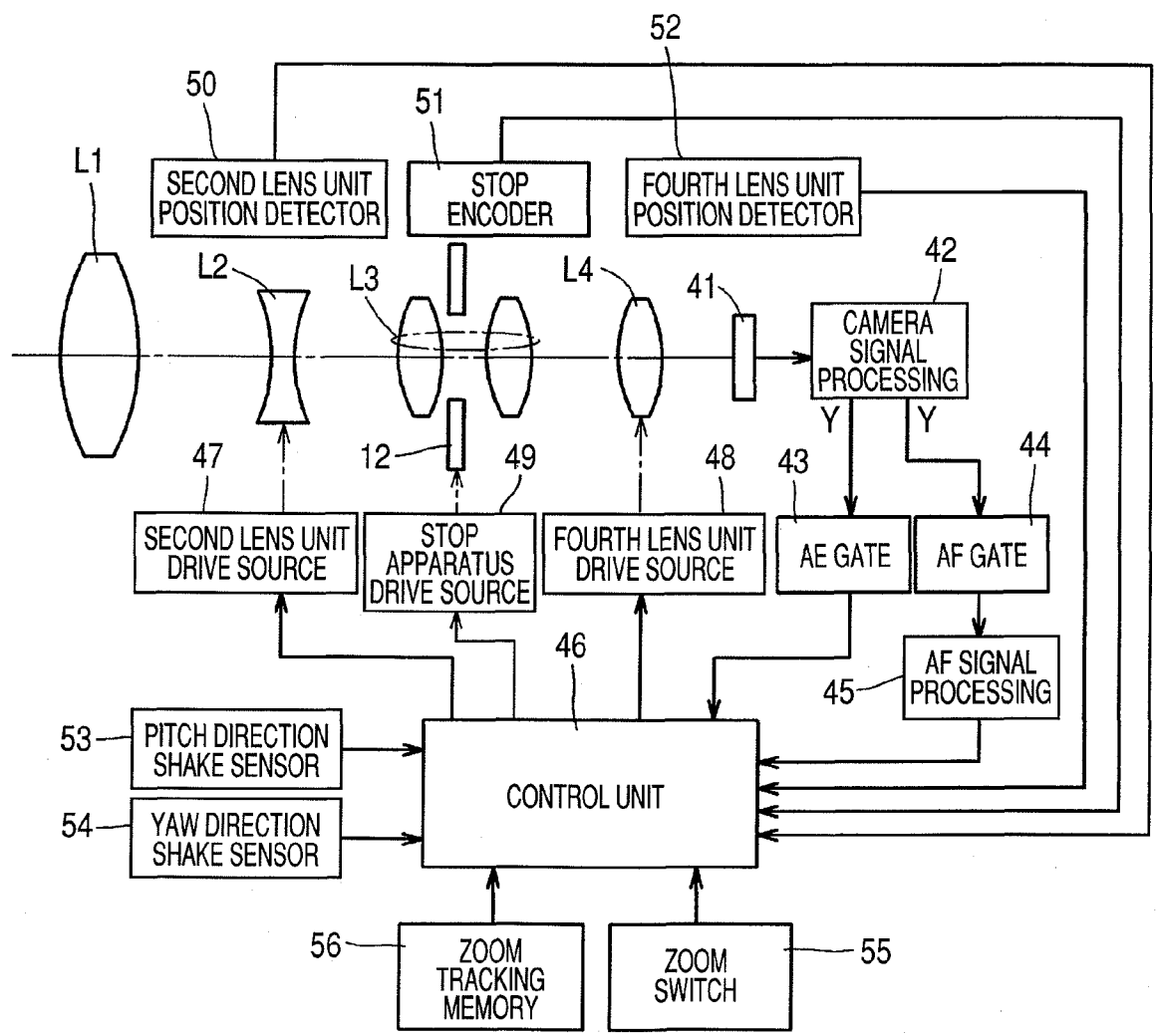
FIG. 11 is a block circuit diagram of a camera according to a second embodiment allowing image blur correction.

FIG. 11 is a diagram illustrating an electrical construction of a camera according to a second embodiment in which the lens barrel of the first embodiment is mounted. The components that are the same as those of the first embodiment are denoted by the same reference symbols.

An object image passed through the first lens unit L1, the second lens unit L2, the third lens unit L3, and the fourth lens unit L4 undergoes imaging on the imaging surface of an image pickup element 41, and the output of the image pickup element 41 is connected to a camera signal processing circuit 42.

The output of the camera signal processing circuit 42 is parallelly connected to an AE gate 43 and an AF gate 44, and the output of the AE gate 43 is connected directly to a control unit 46 for controlling the camera, and the output of the AF gate 44 is connected to the control unit 46 via an AF signal processing circuit 45.

The output of the control unit 46 is connected to a second lens unit drive source 47 for the second lens unit L2, a fourth lens unit drive source 48 for the fourth lens unit L4, and a stop apparatus drive source 49 for the stop apparatus 12.

Further, the outputs of a second lens unit position detector 50, a stop encoder 51, a fourth lens unit position detector 52, a pitch direction shake sensor 53, and a yaw direction shake sensor 54 are connected to the control unit 46.

Further, a zoom switch 55 and a zoom tracking memory 56 are connected to the control unit 46.

The second lens unit drive source 47 is the above-mentioned zoom motor 14 including a stepping motor, and the fourth lens unit drive source 48 is the voice coil motor 13. The second lens unit position detector 50 is the photo interrupter 15, and the fourth lens unit position detector 52 is the optical sensor 16.

A stepping motor or the like is used serving as the stop apparatus drive source 49.

As described above, the third lens unit L3 is driven within a plane orthogonal to the optical axis in the pitch direction and the yaw direction by driving actuators each including the magnet 25, the yokes 27 and 28, and the coil 29.

An optical apparatus such as a camera is provided with the shake sensors 53 and 54 including vibrating gyroscopes or the like for detecting angular changes in the pitch direction and the yaw direction as illustrated in FIG. 9.

The control unit 46 including a CPU or the like controls the actuators based on the outputs from the shake sensors 53 and 54 and a signal from a position sensor including the Hall effect element 30 for detecting the position of the third lens unit L3 within a plane orthogonal to the optical axis.

The actuators are independently drive-controlled in the pitch direction and the yaw direction, respectively.

As described above, the second lens unit position detector 50 is a zoom reset switch for detecting whether or not the second unit moving frame 2 is positioned at a reference position in the optical axis direction.

After it has been detected that the second unit moving frame 2 is positioned at the reference position, the number of pulse signals input to the zoom motor 14 is successively counted, whereby it is possible to detect the movement amount in the optical direction of the second unit moving frame 2, that is, its position with respect to the reference position.

The stop encoder 51 used is of the type in which the Hall effect element is arranged in the stop apparatus drive source 49 and in which the rotation positional relationship between the rotor and the stator is detected.

The fourth lens unit position detector 52 detects the absolute position in the optical axis direction of the fourth unit moving frame 4.

The control unit 46 includes a CPU or the like for supervising camera signals. The camera signal processing circuit 42 performs signal processing such as predetermined amplification or gamma correction on the output from the image pickup element 41.

The contrast signal of the video signal, which has undergone the above-mentioned processing, is supplied to the AE gate 43 and the AF gate 44.

The AE gate 43 and the AF gate 44 respectively set the extraction ranges for the optimum signals for exposure control and focusing from among the video signals of the entire screen.

The size of the gates may be variable, and in some cases, multiple gates are provided. The AF signal processing circuit 45 processes an AF signal for automatic focusing, generating one or multiple outputs related to the high frequency components of video signals.

At the time of magnification operation, the zoom tracking memory 56 stores positional information of the fourth unit moving frame 4 according to the object distance and the distance of the second unit moving frame 2.

A memory in the control unit 46 can be used as the zoom tracking memory 56.

For example, when the zoom switch 55 is operated by the photographer, the control unit 46 controls to maintain a predetermined positional relationship between the second unit moving frame 2 and the fourth unit moving frame 4 calculated based on the information from the zoom tracking memory 56.

That is, control is effected such that the count value indicative of the current absolute position in the optical axis direction of the second unit moving frame 2 and the calculated position at which the second unit moving frame 2 is to be set coincide with each other, and that the count value indicative of the current absolute position in the optical axis direction of the fourth unit moving frame 4 and the calculated position at which the fourth lens unit L4 is to be set coincide with each other.

As a result, the driving of the second lens unit drive source 47 and the fourth lens unit drive source 48 is controlled.

In automatic focusing operation, the control unit 46 controls the driving of the fourth lens unit drive source 48 such that the output of the AF signal processing circuit 45 shows its peak.

Further, in order to attain proper exposure, the control unit 46 controls the driving of the stop apparatus drive source 49 such that the output of the stop encoder 51 is made equal to the reference value which is the average value of the Y-signal outputs having passed through the AE gate 43, thus performing light quantity control.

As described above, the shake sensors 53 and 54 are sensors in the pitch direction and the yaw direction.

Based on the outputs from the shake sensors 53 and 54 and the signals from the Hall effect elements $30y$ and $30p$, the control unit 46 controls the electricity supply to the coils $29y$ and $28p$, and effects image blur correction through driving of the third lens unit L3.

While the embodiments described above are applied to an imaging apparatus in which a lens barrel is provided integrally with a camera main body, the lens barrel of the present invention is also applicable to a replacement lens device detachable with respect to a camera main body, a silver film camera, a digital still camera, a video camera, or the like. Further, it is also applicable to an optical apparatus such as an observation apparatus like a binocular with an image stabilizing function.

This application claims the benefit of Japanese Patent Application No. 2008-066211, filed Mar. 14, 2008, which is hereby incorporated by reference in its entirety.

What is claimed is:

1. An image blur correction apparatus, comprising:
 a movable member retaining one of an image stabilization optical element movable in a direction orthogonal to an optical axis and an image pickup element movable in the direction orthogonal to the optical axis;
 a ball positioning the movable member in an optical axis direction;
 a fixed member positioning the ball in the optical axis direction;
 a drive unit provided with a magnet for driving provided on one of the movable member and the fixed member, and with a coil and a magnetic member provided on the other of the movable member and the fixed member, and
 a restriction portion provided on the fixed member,
 wherein the movable member is retained at a center by an attraction force of the magnet for driving, and regulates, at a time of its movement, rotation in a plane orthogonal to the optical axis by the attraction force of the magnet for driving to a rotation angle equal to or smaller than a first rotation angle,
 wherein the restriction member is abutted to the movable member so that the rotation of the movable member in the plane orthogonal to the optical axis is regulated by a second rotation angle, and
 wherein the first rotation angle is smaller than the second rotation angle.

2. An image blur correction apparatus according to claim 1, wherein the rotating direction restriction portion is configured to have a leeway amount with respect to the movable member in a first direction of the first rotation angle due to the attraction force of the magnet for driving and a leeway amount with respect to the movable member in a second direction opposite to the first direction which is smaller than the leeway amount in the first direction.

3. A lens barrel, comprising the image blur correction apparatus according to claim 1.

* * * * *